Jan. 2, 1923.
J. L. PERKINS ET AL.
BROACH.
ORIGINAL FILED OCT. 28, 1919.
1,440,933.
2 SHEETS—SHEET 1.
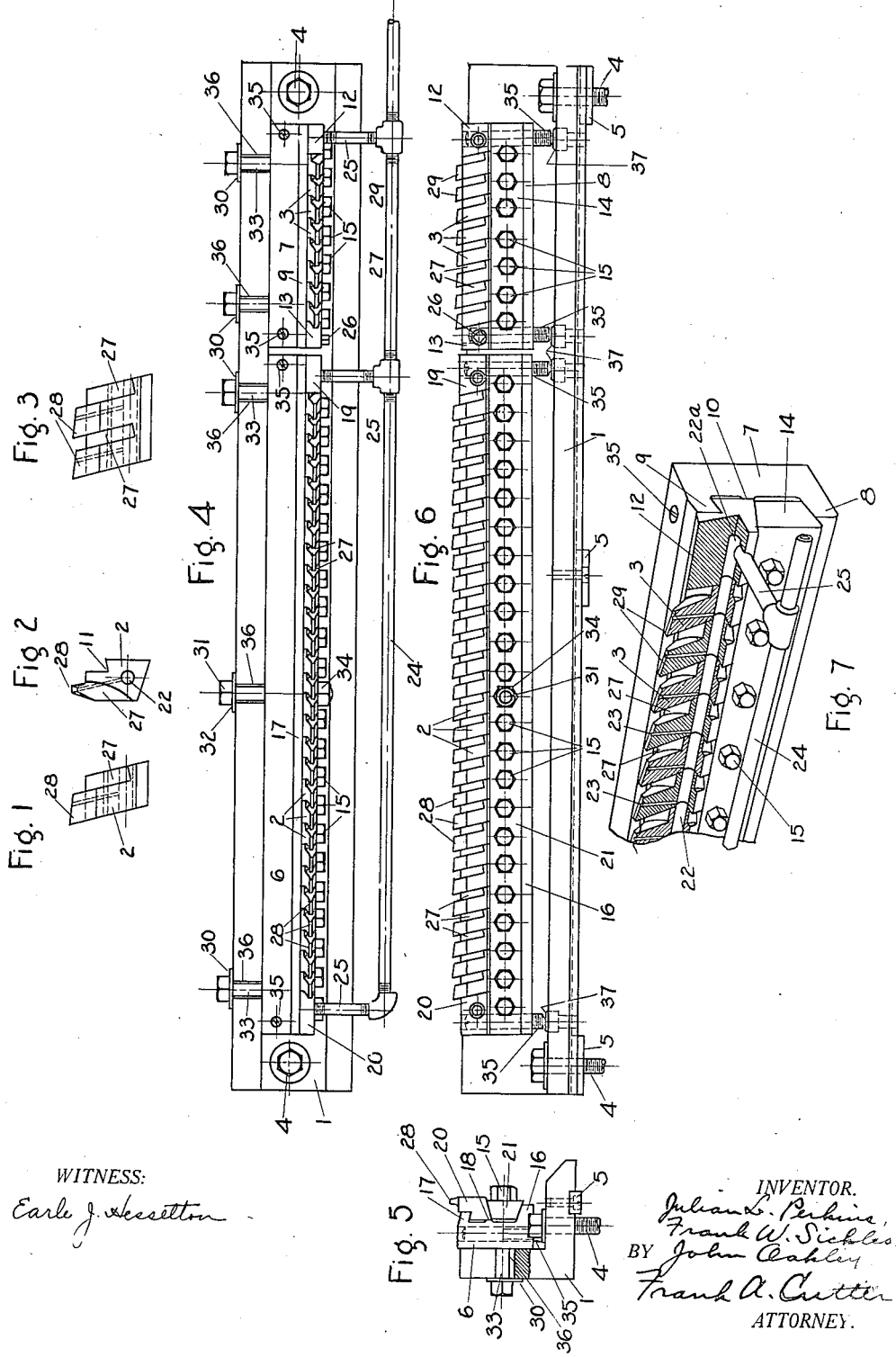
WITNESS:
Earle J. Hessetton
INVENTOR.
Julian L. Perkins,
Frank W. Sickles,
BY John Oakley
Frank A. Cutter
ATTORNEY.

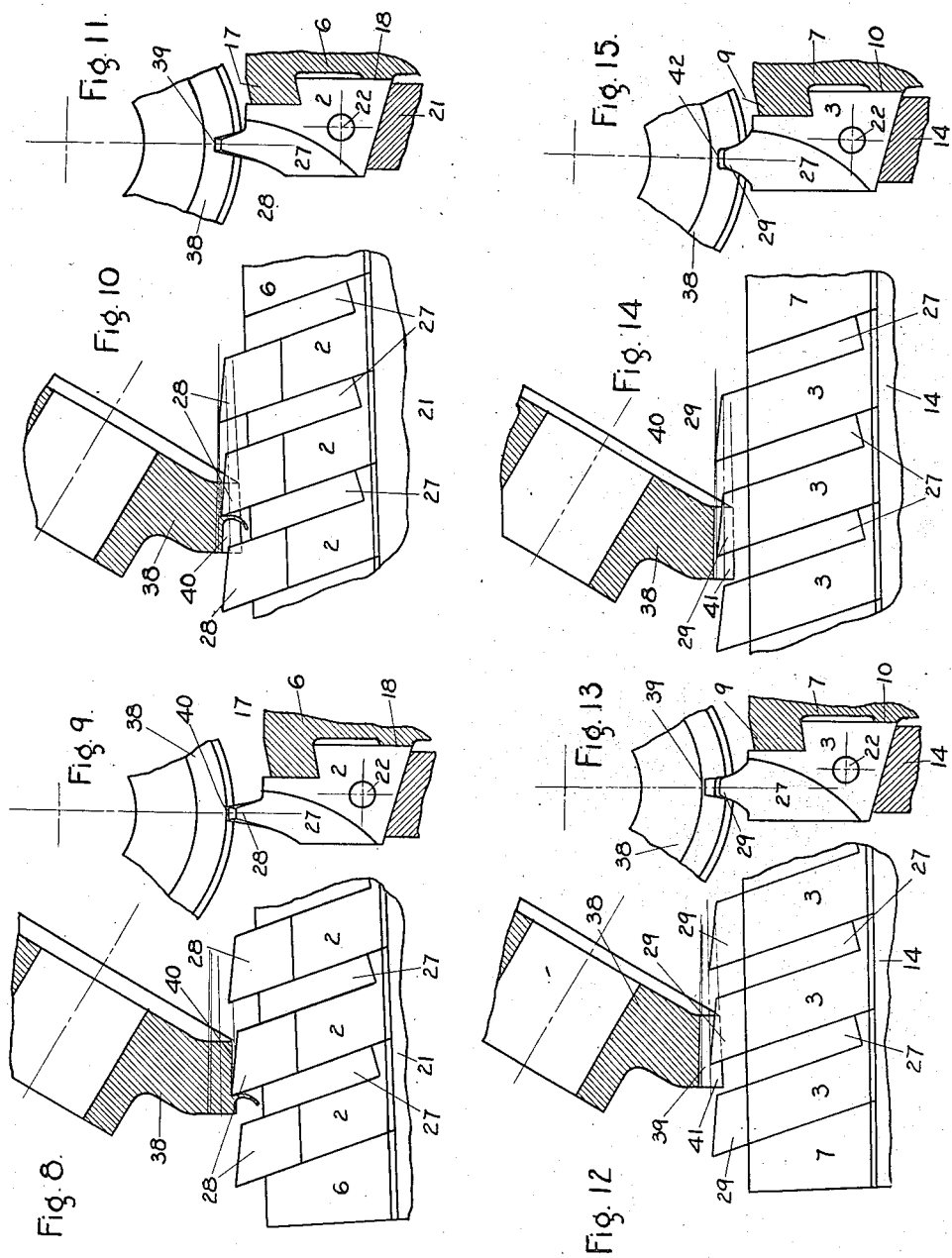

Patented Jan. 2, 1923.

1,440,933

UNITED STATES PATENT OFFICE.

JULIAN L. PERKINS, OF WEST SPRINGFIELD, AND FRANK W. SICKLES AND JOHN OAKLEY, OF SPRINGFIELD, MASSACHUSETTS, ASSIGNORS TO PERKINS APPLIANCE COMPANY, OF SPRINGFIELD, MASSACHUSETTS, A CORPORATION OF MASSACHUSETTS.

BROACH.

Original application filed October 28, 1919, Serial No. 333,987. Divided and this application filed July 15, 1920. Serial No. 396,494.

*To all whom it may concern:*

Be it known that we, JULIAN L. PERKINS, a resident of West Springfield, in the county of Hampden and State of Massachusetts, FRANK W. SICKLES, a resident of Springfield, in said county and State, both citizens of the United States of America, and JOHN OAKLEY, a subject of the King of England, residing in said Springfield, Massachusetts, have invented a new and useful Broach, of which the following is a specification.

Our invention relates to improvements in the art of cutting bevel-gears, spur-gears, racks, and the teeth in other elements of a more or less similar character, and resides in roughing or stocking and finishing, cutting or broaching members or elements of peculiar construction, which are designed especially for use in multiple gear-cutting machines, such as that which forms the subject of our application for United States Letters Patent, filed October 28, 1919, Serial No. 333,987, of which this application is a divisional part.

The primary object of our invention is to provide a broach for cutting teeth in gear blanks accurately and expeditiously, which broach is durable, and has superior faculties whereby it can be kept in order with the minimum amount of labor and expense.

This broach is termed a compound broach or cutter for the reason that it comprises roughing or stocking and finishing cutting or broaching members or elements as aforesaid. The compound broach or cutter is made up of holding means and a row of teeth or cutting units therein, such units being readily removable therefrom and replaceable therein. There is a set of roughing or stocking cutting units in said holding means and a set of finishing cutting units therein behind said stocking cutting units. These cutting units may be easily and cheaply constructed, and they can be quickly changed whenever necessary. It appears, therefore, that the compound cutter comprises a roughing or stocking cutter in front and a finishing cutter behind, the cutting units of said stocking and finishing cutters being independent and separable.

Being separate cutting units they possess advantages inherent or due to that fact. With them more work can be performed at one time than is possible with the ordinary gear-cutting elements, and the work done by said cutting units is accurate, because they are arranged, or backed up, so to speak, so that the cutting strain is on the units themselves, when the compound cutter is engaged in active operation, with the result that the gears cut therewith have very finely finished teeth. Another reason why we are able to produce gear teeth with great accuracy and smoothness of surface finish is because of the small amount of material which it is necessary for each finishing cutting unit to remove. Each following finishing cutting unit enlarges the cut made by the preceding finishing cutting unit, consequently practically all chance of error or irregularity due to any leading finishing cutting unit is removed and prevented from appearing upon or in the finishing product. The last finishing cutting unit, which makes the final cut, has very little stock to remove and consequently lasts a longer time without requiring to be reground or replaced, which is an important advantage because this is the unit that determines the final size and shape of the cut.

Inasmuch as each stocking cutting unit makes but one cut at each stroke of the compound cutter of which such unit constitutes a part, and each finishing cutting unit makes but one cut at each stroke of said compound cutter, there is ample time for the units to cool, and the wear of the same is minimized.

The peculiar construction of the compound broach as a whole and of its cutting units permits a deeper cut to be made than can be done with planer implements, due to the fact that said cutting units are in line with each other, one behind the other in the direction of operative movement or cutting action, and each is the full width and size of the slot which is cut by the cutter of which the units form a part, that is to say, each unit is capable of making a cut that is equivalent to the entire cutting contour of said unit, which contour has three superfices, namely, outer transverse and lateral, two of the latter.

By providing a series of roughing or stocking and a series of finishing cutting units, such as described above, a distinctive and most important advantage accrues in that each of such units removes a predetermined amount of metal from the same portion of the work at each stroke, the amount removed by each succeeding unit being slightly more than that removed by each preceding unit; and the finishing units are saved from the wear and tear and service of the stocking or roughing operation, and their cutting portions or parts maintain or retain an accurate and sharp contour for a correspondingly longer period.

The amount of material removed in a given time by our compound broach, as compared with the amount removed by either a rotary or a planer cutting element, is several times as great, for the reason that the successive cutting edges of the rotary cutting elements are brought into action one at a time, or at best two only are in contact at the same time with the stock to be removed, in the one case, and the planer cutting elements remove only one comparatively small portion of the gear-tooth slot and only a single cutting element is in action at one time, except in the double-planer machine where two may be in action, while with our broach as many cutting units, each of which is equal to the total width of the slot in which it operates and which is cut thereby, can be in actual use as is practical, so that a continuous cutting process is carried on as each unit removes the maximum amount of stock.

Without the finishing cutting units directed back of the roughing or stocking cutting units, it would not be possible to stock and finish the work at one stroke, the great importance and value of doing which is clearly apparent.

In our broached gear, the shape of the gear tooth corresponds exactly with the shape of the last cutting unit of the finishing cutter, or, to state it differently, the finishing cutter produces a slot into which said last unit fits, because the direction of movement of the cutting unit in making its active stroke is in a straight line through the work, and said cutting unit cannot cut a slot larger than itself. The advantage of this result over the result produced by either a rotary cutter, or reciprocating planing cutters that pass through and operate in the work on planes parallel with the axis of the work is clear, when it is remembered that each cutting element, in either of these cases, may not pass in exactly the same plane and will, therefore, make the slot cut thereby larger than and of a different form from the one required. Inaccuracy of this character may be caused, also, when a cutter does not run true on its arbor, when end- lash is present in the machine spindle, when expansion of the arbor caused by warping and hardening takes place, or in the event each cutting element or member be not itself formed accurately relative to all others with which it is associated. More especially is this true in the case of the reciprocating planing cutter which does not form a complete gear-tooth slot with each stroke, but depends on a number of strokes to complete such a slot. The accuracy of the gear-tooth slot, in the latter case, depends entirely upon the accuracy of the whole machine and of the path in which the planer members are guided. A cutting element which is dull will spring away from the work, if it come in contact with one side only of the slot, while the full-width cutting unit cannot pass through unless it have a path of its own shape and size.

When the finishing cutter in our broach becomes worn, it is necessary to replace only two or three of the last cutting units in order to maintain the standard size and shape of the gear-tooth slot cut thereby.

It is not necessary to change the roughing cutter, when cutting gears having different numbers of teeth of the same pitch, but only to change the finishing cutter, replacing the latter with a finishing cutter having cutting units the curvatures of which correspond with the curvatures of the gear-tooth slots.

The roughing cutter is usually longer than the finishing cutter, that is to say, the former has more cutting units than the latter.

The type of the gear cut by this machine agrees exactly with that of the finishing cutter with which it is cut, for the reason that said cutter is drawn through the gear blank in a perfectly straight line and removes an equal or uniform amount of stock with its entire contour, so that the forces or stresses are balanced and there is no tendency to offset or cut over-size. This is also true in the event the work is moved in contact with a stationary cutter, as it is possible to do with our broach. "Entire contour", as used here and elsewhere in the specification, refers to the contour of the complete cutting edge of each cutting unit.

Another object is to provide means whereby the cutting units in the roughing cutter are all of the same size, length, and shape, and the cutting units in the finishing cutter are all of the same size, length, and shape. This materially reduces the initial cost of the cutters and also the cost of repairing them and of sharpening the cutting units.

Still another object is to provide means for tilting or inclining the roughing and finishing cutters to produce the required depth of slot, in consequence of which it is practicable to employ the cutting units of uniform size and shape, of which mention has been made, and the advantages of employing which have been set forth.

Other objects and advantages will appear in the course of the following description.

A preferred embodiment of our invention, whereby we obtain the objects and secure the advantages of the same, is illustrated in the accompanying drawings, and we will proceed to describe said invention with reference to said drawings, although it is to be understood that the form, construction, arrangement, etc., of the parts and members in various aspects are not material and may be modified without departure from the spirit of the invention.

In the drawings, in which similar characters of reference designate similar parts throughout the several views, Figure 1 is a side elevation of a detached cutting unit; Fig. 2, an end elevation of such unit; Fig. 3, a side elevation of a double cutting unit or two such units united or integral; Fig. 4, a top plan of a compound cutter or broach which embodies a practical form of our invention as aforesaid; Fig. 5, an end elevation of said broach, the oil conduits shown in the preceding view being omitted, (this is really a left-hand elevation of Fig. 6); Fig. 6, a front elevation of said broach, without said conduits; Fig. 7, an enlarged, perspective view of the major portion of the finishing cutter of said compound broach, parts being in section; Fig. 8, an operative view showing the cut made by the second leading cutting unit of the roughing cutter, a fragmentary portion of which latter is shown in side elevation and a bevel-gear blank in section; Fig. 9, an end elevation of the parts shown in Fig. 8 as viewed from the right, parts of the roughing cutter being in section; Fig. 10, a view similar to Fig. 8, but showing the roughing cutter about to complete its cut; Fig. 11, an end elevation, in partial section, of the parts shown in Fig. 10; Fig. 12, an operative view illustrating the early operation of the finishing cutter, the view being generally similar to that appearing in Fig. 8; Fig. 13, an end elevation, in partial section, of the parts shown in Fig. 12; Fig. 14, a view similar to Fig. 12 except that the finishing cutter is about to complete the gear-tooth slot; and, Fig. 15, an end elevation, in partial section, of the parts shown in the preceding view.

The cutting unit shown in Figs. 1 and 2 is one of the cutting units in the roughing cutter of the compound broach illustrated in Figs. 4, 5, 6, and 7.

The compound broach consists of a supporting member or support 1, and a roughing or stocking cutter and a finishing cutter mounted on and attached to said support, said roughing and finishing cutters comprising, respectively, independent, removable cutting units 2 and 3. The support 1 is angular in cross section, and designed to be securely attached to a bed-plate or other member of the machine in which the compound broach is employed, and which bed-plate or member is adapted to carry the broach, or to support the same in the event of the machine being constructed so that the work travels instead of the broach. Bolts 4 and short splines 5 may be provided for securely attaching the support 1 to its bed-plate or other member.

The roughing cutter and the finishing cutter consist in part of a long holder 6 and a short holder 7, respectively. The holders 6 and 7 and the parts and members attached thereto and held thereby are substantially alike, the principal differences being in matters of length, number of cutting units, and shape of cutting parts, so that a description of the holder 7 and the members more or less closely and intimately connected and associated therewith, having especial reference to Fig. 7, is applicable to the holder 6 with its connected and associated members.

The holder 7 has a forwardly-extending, longitudinal lip or flange 8 at the bottom, the top of which flange inclines from within outwardly and downwardly, and said holder has a forwardly-extending, longitudinal lip or flange 9 at the top, the under side of which latter flange inclines from within outwardly. Preferably the top of the flange 9 has a more or less similar inclination to that of the bottom of said flange for clearance purposes. On the inside face of the upright part of the holder 7 is a finished rib or backing piece 10 for the cutting units 3. Each cutting unit 3 has in what may be termed the backside thereof, at the top, a V-shaped groove 11 (see Fig. 2), which extends from end to end of said unit, and is adapted to receive the acute-angled part of the flange 9. An end block 12 is provided at the right-hand end of the row of cutting units 3, and an end block 13 is provided at the left-hand end of such row. These blocks are not as high as the cutting units 3, and their outer ends are vertical, while both ends of each of said units are oblique, but otherwise said blocks are of the same general shape and construction as said units. When the cutting units 3 and the end blocks 12 and 13 are in engagement with the flange 9, and with the inner or backsides of said units and blocks against the rib 10, the undersides of said units and blocks incline outwardly and upwardly from their lower rear or inner edges, and a wedge bar 14 is introduced between the flange 8 and said units and blocks. Bolts 15, which pass through the wedge bar 14 in the holder 7, and into which latter said bolts are tapped, force said bar tightly into place beneath the cutting units 3 and the blocks 12 and 13, and so hold said bar and cause the latter to crowd said units and blocks tightly into contact with the flange 9 and the rib 10, so that it is impossible under ordinary conditions for said units and blocks to become displaced in the slightest degree. Upon loosening the bolts 15 and thereby the wedge bar 14, either or both end blocks can be removed and replaced, so that any of the cutting units can be taken out and replaced.

The parts and members of the holder 6 which correspond with the parts and members of the holder 7 except in the matter of length, are designated as follows: The bottom flange at 16, the top flange at 17, the backing rib at 18, the end blocks at 19 and 20, respectively, and the wedge bar at 21, the bolts for the wedge bar having the same numerals as before. The oblique end of the cutting units 2 and 3, of which mention has been made, impart a rearward pitch or inclination to said units as a whole, toward the work, and the blocks 12 and 19, therefore, incline from the bottom upwardly and toward the left at their left-hand ends, while the end blocks 13 and 20 incline from the top downwardly and toward the right at their right-hand ends. The outer ends of the blocks 19 and 20, as well as the corresponding ends of the blocks 12 and 13, are vertical, and all may be flush with the adjacent ends of the wedge bars.

It is to be understood that the compound broach illustrated in connection herewith either travels to the left through the work, or the latter is caused to travel to the right in contact with said broach, according to the kind of machine in which the broach is used, wherefore it follows that the left-hand end of the broach is the leading or front end.

In the absence of holding or securing means of the character hereinbefore described, or of some other more or less similar character, it would be necessary to construct the cutting elements with the members, which are now separable, wholly or partially integral, or, in other words, with the cutting units integral with a shank or holder, or integral with some member which could be attached to a holder or equivalent member of some description, thus adding greatly to the initial cost and to the upkeep of the cutting elements.

Referring again to Fig. 7, it will be seen that each of the cutting units has a horizontal oil passage 22 and an upwardly directed oil passage 23 therein, the latter opening into the former at the bottom and through the top of the unit at the upper end. Each of the end blocks 12 and 13 has a horizontal oil passage $22^a$ therein, which connects with the passage 22 in the contiguous cutting unit 3. Similar oil passages are provided in the cutting unit 2 and the blocks 19 and 20. Oil is supplied through pipes 24 and 25 to the end blocks 12, 19 and 20, with the passages $22^a$ in which said pipes 25 directly communicate. Oil is pumped or otherwise forced into the pipe 24 and thence into the pipes 25 and the passages $22^a$ and 22 to escape through the passages 23. The pipe 24 extends parallel with the support 1, and beside the roughing and finishing cutters. The pipes 25 extend from the pipe 24 to the end blocks as already observed, or rather to the end blocks 12, 19, and 20. connection with the end block 13 not being made because it is not usually necessary to force the oil into both ends of the finishing cutter. Provision is made for connecting the end block 13 with the oil supply in the event it be necessary or desirable to do so. The entrance to the block 13 for an additional pipe 25 is plugged as shown at 26 in Fig. 6. Before removing any end block with which is connected one of the pipes 25, it is necessary to disconnect such pipe, or in some other manner disconnect the oil supply from said block.

The oil forced through the pipes 24 and 25 into the end blocks 12, 19, and 20 passes into and through the cutting units 3 and 2, escaping at the top of such unit behind, in the direction of the cutting stroke of said units, the upper cutting edges thereof, and therefore, lubricates said units to the required extent, discharging the lubricant at and immediately adjacent to the points where the cutting operations are taking place, which are the most advantageous points for lubricating purposes. At the same time the lubricant assists in carrying away the chips cut by the the cutting units. It is assumed here, and generally so assumed throughout this description, that the compound broach moves while the work is stationary, although as has been stated said broach might be held stationary while the work was caused to move.

Each cutting unit 2 and 3 has therein a chip-clearance passage 27. The passage 27 is formed in the side of the cutting unit, behind, in the direction of travel of said unit when making its cut, from the approximate base of the cutting part of the unit, and outwardly to the front edge of the unit, being in the side which is opposite to that wherein the V-shaped groove 11 is located. The relative positions in the cutting units of the oil passages 22 and 23, the groove 11, and the chip-clearance passage 27, and the aforesaid cutting part of said unit are clearly shown in Fig. 2. It will be observed that the passage 23 is smaller than the passage 22, the reason for which is obvious. The cutting part of each unit 2 is indicated by the numeral 28, and such part of each unit 3 is indicated by the numeral 29.

The roughing and finishing cutters have to be tilted or inclined to the horizon sufficiently to obtain with their cutting units, which are all of the same height, the required depth of slot, and to this end a plurality of horizontal bolts or cap-screws 33 and washers 30, a horizontal bolt 31, washer 32, and nut 34, and a plurality of vertical, adjusting screws 35 are provided, and a series of horizontal slots 36 are formed in the vertical part of the support 1. The slots 36 open through the top of the upright part of the support 1. In the present case there is a cap-screw 33 and a screw 35 at each end of the roughing and one of each at each end of the finishing cutter, and in addition to the said screws for said roughing cutter the bolt 31, washer 32, and nut 34 are provided. The washers 30 are introduced between the heads of the cap-screws 33 and the adjacent sides of the upstanding part of the support 1, and the washer 32 is introduced between the head of the bolt 31 and said part of said support. The cap-screws 33 and the bolt 31 are received in the slots 36, and said cap-screws are tapped into the holders 6 and 7, while the bolt 31 passes through said holder 6 and its wedge bar 21 to receive the nut 34 outside of said bar. The purpose of the bolt 31 and nut 34 is to prevent the central part of the long roughing cutter from springing outwardly from the upright part of the support 1. The slots 36 are of sufficient size to enable the cap-screws 33 and the bolt 31 to be moved therein to whatever extent may be necessary in order to give to the roughing and finishing cutters the proper incline. The bolts 35 are tapped into and extend through the holders 6 and 7, passing downwardly behind the end blocks 12, 13, 19, and 20, and bear at their bottom ends on the horizontal part of the support 1, or on bearing members 37 set in such horizontal part. The holders 6 and 7 and the cutters, of which such holders constitute parts, are adjusted at the required angle to the horizontal part of the support 1, by turning the screws 35 up and down as may be and to the extent required. This is done after loosening the cap-screws 33 and the nut 34. After tilting or inclining the two cutters at the proper angle or angles, by means of the screws 35, the cap-screws 33 are retightened and the nut 34 is retightened on the bolt 31. Convenient and accurate means are thus afforded for adjusting at any time the roughing and finishing cutters to the required angle or angles, and for securely holding them after such adjustment. The proper adjustment of each cutter requires that the distance between the plane of the top of the cutting part (28 or 29), of the front or foremost cutting unit (2 or 3), and that of the top of such cutting part, of the rearmost cutting unit, be equal to the depth of the gear-tooth slot cut by said units in conjunction with the units which intervene. It is now clearly to be seen how we are able to utilize compound cutters or broaches which have roughing and finishing cutters each with cutting units of the same size and height or depth. Otherwise it would be necessary to employ in each cutter cutting units of different sizes or at least of different heights or depths.

Although we prefer to employ cutting units which have a single cutting part 28 (or 29) and a single chip-clearance passage 27, such part and such passage may be duplicated in a single unit as shown in Fig. 3, and it might, in some cases, be feasible to provide a cutting unit with even more than two of the parts and passages in question. The compound unit shown in Fig. 3 naturally has an oil passage 23 to open through each cutting part 28, in the event the oil passages be provided.

The cutting part 28, of each cutting unit 2, is narrower than the finished slot in the gear blank which is cut in part by said unit, while the width of the cutting part 29, of each cutting unit 3, is of the width of said slot and with its companion cutting unit makes the finishing cut whereby said slot is produced. The cutting units 2 first cut the slot of the proper depth, but of a slightly less width than is required for the finished slot, and usually without curvatures therein, and then the cutter 3 takes off a little on both sides of the slot cut by said units 2, thus cutting said slot to width and at the same time forming the curves in the sides of said slot which constitute in part the sides of two of the finished gear teeth. In other words, the cutting units 2 are sufficiently smaller than the slot to permit the cutting units 3 to give the required form or shape to said slot. The cutting units herein shown are for involute gear teeth. For cycloidal teeth some change in the general shape of the cutting units will be required, but the foregoing rule would, nevertheless, apply.

In Figs. 8 and 9 we have illustrated the operation of the roughing cutter at the beginning of its operation on a gear blank 38, wherein the leading cutting units 2, in the direction of the compound broach when advancing, are making their initial cut in said blank, while in Figs. 10 and 11 the rearmost, following cutting units 2 are coming into action and the slot is being materially deepened and shortly will be of the required depth, substantially as is represented at 39 in Figs. 11, 12, and 13. The slot while in the process of being roughed out is represented at 40. The initial operation of the cutting units 3, of the finishing cutter, is illustrated in Figs. 12 and 13, wherein the leading units are widening, as represented at 41, the slot 40. In the last two views the cutting units 3, which are at or adjacent to the rear end of the finishing cutter, in the direction of travel in making its cut, are almost in the act of completing the slot 40 and converting it into a true gear-tooth slot, substantially like that represented at 42 in Fig. 15.

The operation of the cutting units 2 and 3, and the manner in which gear blanks are cut therewith, will clearly be understood from the foregoing explanation, together with the illustrations to which the same specifically refers.

The lubricating means herein provided may be omitted, and some other means or method for lubricating the cutting parts may be substituted therefor.

With this broach a complete gear-tooth slot is cut every time that said broach advances to the full extent of its forward travel.

The compound broach may be comparatively short, since it is necessary to provide only a sufficient number of cutting units to obtain the required depth and width of slot without undue strain on either said units or the material being cut, and without undue wear and tear on said units, it having been found that a great amount of accurate and satisfactory work can be performed with a compound broach which is comparatively short and comprises a comparatively small number of cutting units. It is both practicable and possible to cut gears with this broach at a fairly high rate of speed.

The cutting units in each set cut the full width of slot by a simultaneous action, to some extent at least, on all three sides of the slot. Although the finishing units enter the slot cut by the roughing units, and do not, therefore, remove the central portions of the material from the slot, since that has already been removed, they do cut and shape all three sides of the slot to a greater or less extent, and, in the absence of the roughing units, would cut away all of the material to form the slot, so that said finishing units are, to all intents and purposes, of the same nature as the roughing units, and are no more similar to a rotary cutter or milling tool, or a pair of planing tools, than are the roughing units.

A portion of the upstanding part of support 1 is broken away, in Fig. 5, in order to show more clearly one of the slots 36 and the cap screw 29 therein.

What we claim as our invention, and desire to secure by Letters Patent, is—

1. A compound broach comprising a roughing cutter and a finishing cutter, said roughing cutter consisting in part of separable cutting units.

2. A compound broach comprising a roughing cutter and a finishing cutter, said finishing cutter consisting in part of separable units.

3. A compound broach comprising a roughing cutter and a finishing cutter, said roughing and finishing cutters consisting in part of removable cutting units.

4. A broach having cutting units which are separable from each other and uniform in height, a support for said cutting units, and means to position cutting units at an incline to said support.

5. A compound broach comprising roughing and finishing cutters, a support therefor, and means to position said roughing cutter at an incline to said support.

6. A compound broach comprising roughing and finishing cutters, a support therefor, and means to position said finishing cutter at an incline to said support.

7. A compound broach comprising a roughing cutter having teeth on one side, and a finishing cutter having teeth on the corresponding side, a support for said cutters, and means to position said cutters at an incline to said support.

8. A compound broach comprising roughing and finishing cutters, a support therefor, said roughing cutter consisting in part of cutting units of uniform height, and means to position said roughing cutter at an incline to said support.

9. A compound broach comprising roughing and finishing cutters, a support therefor, said finishing cutter consisting in part of cutting units of uniform height, and means to position said finishing cutter at an incline to said support.

10. A compound broach comprising roughing and finishing cutters, a support therefor, each of said roughing and finishing cutters consisting in part of cutting units of uniform height, and means to position said roughing and finishing cutters at an incline to said support.

11. A compound broach comprising roughing and finishing cutters, a support therefor, said roughing cutter consisting in part of separable cutting units of uniform height, and means to position said roughing cutter at an incline to said support.

12. A compound broach comprising roughing and finishing cutters, a support therefor, said finishing cutter consisting in part of separable cutting units of uniform height, and means to position said finishing cutter at an incline to said support.

13. A compound broach comprising roughing and finishing cutters, a support therefor, each of the latter consisting in part of separable cutting units of uniform height, and means to position said roughing and finishing cutters at an incline to said support.

14. The combination, in a broach, with a support, of a cutter secured to said support, said cutter comprising separable cutting units, and means to position said cutter on said support at an incline thereto which may be varied.

15. The combination, in a broach, with an angular support, of a cutter, adjustable means to secure said cutter to the vertical part of said support, and adjusting means for said cutter to position the same at an incline to the bottom of said support.

16. The combination, in a broach, with an angular support, of a cutter, bolts adapted to secure said cutter to the vertical part of said support, the latter being provided with slots for the accommodation of said bolts, and bolts at the ends of said cutter to support said cutter from the bottom of said member at an incline thereto.

17. The combination, in a broach, with an angular support, of roughing and finishing cutters, means to attach said cutters to the upright part of said support, and means at the ends of said cutters to support the same from the bottom of said member at an incline thereto.

18. In a broach, a holder having a top flange which is angular in cross section, and a bottom flange which is inclined on the upper side, a plurality of separable cutting units recessed to receive said angular top flange, and having tapered bottoms, a wedge bar receivable between said inclined upper side of said bottom flange and said tapered bottoms of said units, and means to hold said wedge bar in place.

19. In a broach, a holder having a top flange which is angular in cross section, and a bottom flange which is inclined on the upper side, a plurality of separable cutting units and end blocks, each of said units and end blocks having recessed parts to receive said first-named flange, and tapered bottoms, a wedge bar receivable between the inclined part of said bottom flange and said inclined bottoms, and means to retain said wedge bar in place.

20. In a broach, a support, holders having upper flanges which are angular in cross section, and beveled under flanges, pluralities of cutting units for each of said holders, said units being recessed to receive said upper flange, and being tapered on their under sides, and wedge bars receivable between said under flanges and said under sides of said cutting units, means to secure said wedge bars in place, and means to secure said holders to said support.

21. The combination, in a broach, with an angular support, of holders, pluralities of cutting units, means to secure said cutting units to said holders, and means to secure said holders to the vertical part of said support, said holders being arranged in line with each other on said support.

22. The combination, in a broach, with an angular support, of holders, pluralities of cutting units, means to secure said units to said holders, and bolts to secure said holders to the vertical part of said support, the latter being slotted to receive said bolts.

23. A compound cutter comprising roughing and finishing cutters made up of separable units, and having longitudinal and lateral oil passages therein, said lateral oil passages opening through the cutting parts of said units, and said longitudinal oil passage being adapted to receive the oil initially.

24. A compound broach comprising a single row of cutting parts capable of broaching a rudimentary gear-tooth slot in a blank, and, following said row, a single row of cutting parts capable of finishing such slot, both of said rows being in the same straight line, and on one side only of a given plane to which all of said cutting parts are approximately perpendicular.

25. A compound broach comprising a single row of cutting parts capable of broaching a rudimentary gear-tooth slot in a blank, and, following said row, a single row of cutting parts capable of finishing such slot, both of said rows being in the same straight line, and on one side only of a given plane to which all of said cutting parts are approximately perpendicular, and each of the cutting parts of said first-named row having the same amount of projection beyond such plane.

26. A compound broach comprising a single row of cutting parts capable of broaching a rudimentary gear-tooth slot in a blank, and, following said row, a single row of cutting parts capable of finishing such slot, both of said rows being in the same straight line, and on one side only of a given plane to which all of said cutting parts are approximately perpendicular, and each of the cutting parts of said second-named row having the same amount of projection beyond such plane.

27. A compound broach comprising a single row of cutting parts capable of broaching a rudimentary gear-tooth slot in a blank, and, following said row, a single row of cutting parts capable of finishing such slot, both of said rows being in the same straight line, and on one side only of a given plane to which all of said cutting parts are approximately perpendicular, each of the cutting parts of said first-named row having the same amount of projection beyond such plane, and each of the cutting parts of said second-named row having the same amount of projection beyond such plane.

JULIAN L. PERKINS.
FRANK W. SICKLES.
JOHN OAKLEY.

Witnesses:
A. C. FAIRBANKS,
F. A. CUTTER.